(12) United States Patent
Kumata et al.

(10) Patent No.: US 11,632,406 B2
(45) Date of Patent: Apr. 18, 2023

(54) INFORMATION PROCESSING SYSTEM, INFORMATION PROCESSING METHOD, AND RECORDING MEDIUM RECORDING INFORMATION PROCESSING PROGRAM

(71) Applicant: SHARP KABUSHIKI KAISHA, Sakai (JP)

(72) Inventors: Akihiro Kumata, Sakai (JP); Daisuke Yamashita, Sakai (JP); Tomonobu Tomaru, Sakai (JP)

(73) Assignee: SHARP KABUSHIKI KAISHA, Sakai (JP)

( * ) Notice: Subject to any disclaimer, the term of this patent is extended or adjusted under 35 U.S.C. 154(b) by 0 days.

(21) Appl. No.: 17/313,288

(22) Filed: May 6, 2021

(65) Prior Publication Data

US 2021/0385262 A1    Dec. 9, 2021

(30) Foreign Application Priority Data

Jun. 3, 2020    (JP) .............................. JP2020-096632

(51) Int. Cl.
| | |
|---|---|
| *H04L 65/401* | (2022.01) |
| *H04L 65/403* | (2022.01) |
| *G06F 3/14* | (2006.01) |
| *H04N 7/15* | (2006.01) |

(52) U.S. Cl.
CPC ........ *H04L 65/4015* (2013.01); *G06F 3/1454* (2013.01); *H04L 65/403* (2013.01); *H04N 7/152* (2013.01)

(58) Field of Classification Search
None
See application file for complete search history.

(56) References Cited

U.S. PATENT DOCUMENTS

| | | | |
|---|---|---|---|
| 2004/0128354 A1* | 7/2004 | Horikiri | H04N 7/152 348/E7.083 |
| 2009/0228801 A1* | 9/2009 | Lee | G06Q 10/10 715/730 |
| 2014/0226537 A1* | 8/2014 | Kashimba | H04L 65/4038 370/261 |
| 2015/0019694 A1* | 1/2015 | Feng | H04L 65/75 709/219 |

(Continued)

FOREIGN PATENT DOCUMENTS

| | | |
|---|---|---|
| JP | 2004-171526 A | 6/2004 |
| WO | WO-2018018965 A1 * | 2/2018 |

*Primary Examiner* — Chris Parry
*Assistant Examiner* — Abderrahmen Chouat
(74) *Attorney, Agent, or Firm* — ScienBiziP, P.C.

(57) ABSTRACT

An information processing system includes: a reception processor which receives a display request for displaying a display screen of a first user terminal on one or a plurality of display devices, from the first user terminal of a first user among a plurality of users participating in a conference; a specifying processor which specifies a first display application for enabling the display screen to be shared by all users participating in the conference, of display applications which can be used in the first user terminal and the one or plurality of display devices, when the display request has been received by the reception processor; and an output processor which outputs a display instruction including information of the first display application specified by the specifying processor, to the first user terminal.

8 Claims, 10 Drawing Sheets

(56) References Cited

U.S. PATENT DOCUMENTS

2016/0021340 A1* 1/2016 Kato .................. H04N 1/32122
348/14.04
2018/0331840 A1* 11/2018 Sugano ................ H04L 65/403

* cited by examiner

CONFERENCE INFORMATION

| CONFERENCE ID | CONFERENCE NAME | LOCATION (CONFERENCE ROOM ID) | START DATE/TIME | END DATE/TIME | PARTICIPANT ID (USER ID) | ATTACHED FILE |
|---|---|---|---|---|---|---|
| 10001 | CONFERENCE X | R01,R02 | 13:00 | 14:00 | U001,U002, U003,U004 | F01,F02 |
| 10002 | CONFERENCE Y | R02 | 15:00 | 15:30 | U007,U008 | F03 |
| 10003 | CONFERENCE Z | R01 | 15:00 | 16:00 | U005,U006 | F04,F05 |

CONFERENCE ROOM INFORMATION

| CONFERENCE ROOM ID | CONFERENCE ROOM NAME | CONFERENCE ROOM TERMINAL ID |
|---|---|---|
| R01 | CONFERENCE ROOM 1 | S001 |
| R02 | CONFERENCE ROOM 2 | S002 |

| USER INFORMATION ||||
|---|---|---|---|
| USER ID | USER NAME | PASSWORD | CONFERENCE ROOM ID FOR PARTICIPATION |
| U001 | A | ****** | R01 |
| U002 | B | ****** | R01 |
| U003 | C | ****** | R02 |
| U004 | D | ****** | R02 |

| USER TERMINAL INFORMATION ||||
|---|---|---|---|
| USER ID | IP ADDRESS | INSTALLED APPLICATION | APPLICATION CONNECTION INFORMATION |
| U001 | 192.168.0.101 | A001, A002 HDMI | A001(**) A002(**) |
| U002 | 192.168.0.102 | A001, HDMI | A001(****) |
| U003 | 192.168.0.103 | A001, A002 HDMI | A001(**) A002(**) |
| U004 | 192.168.0.104 | A001, HDMI | A001(****) |

CONFERENCE ROOM TERMINAL INFORMATION

| CONFERENCE ROOM TERMINAL ID | IP ADDRESS | INSTALLED APPLICATION | APPLICATION CONNECTION INFORMATION |
|---|---|---|---|
| S001 | 192.168.01 | A001<br>A002 | A001(**)<br>A002(**) |
| S002 | 192.168.02 | A001, HDMI | A001(****) |
| S003 | 192.168.03 | A004 | A004(****) |
| S004 | 192.168.04 | A003, HDMI | A003(****) |

APPLICATION INFORMATION

| SCREEN SHARING APPLICATION ID | COMPATIBLE APPLICATION ID | RESTRICTION INFORMATION |
|---|---|---|
| A001 | A001 | NUMBER OF SIMULTANEOUS CONNECTIONS: 4 |
| A002 | A002, A001 | NUMBER OF SIMULTANEOUS CONNECTIONS: 6 |
| A003 | A003 | NUMBER OF SIMULTANEOUS CONNECTIONS: 2 |
| A004 | A004 | NUMBER OF SIMULTANEOUS CONNECTIONS: 1 |

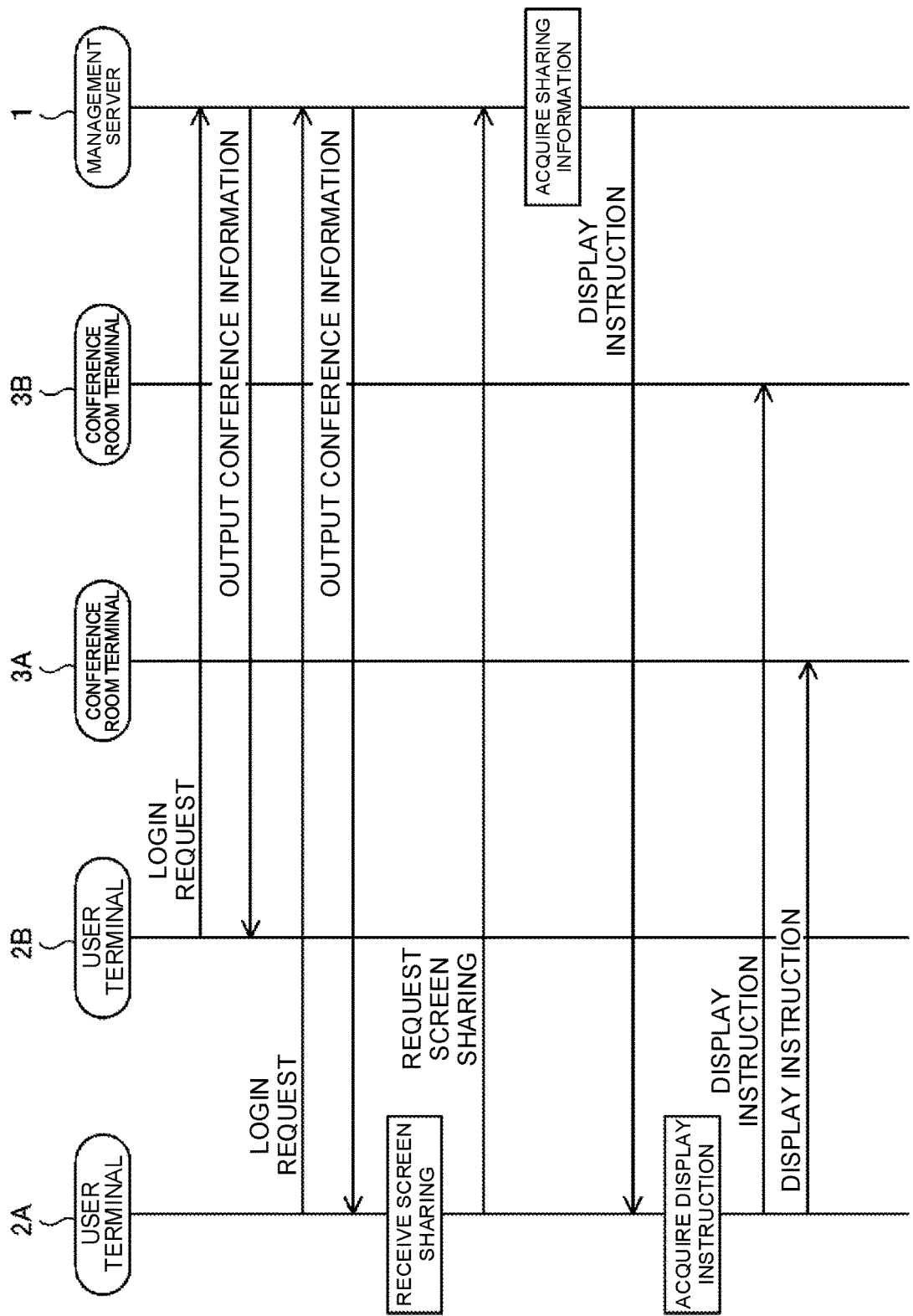

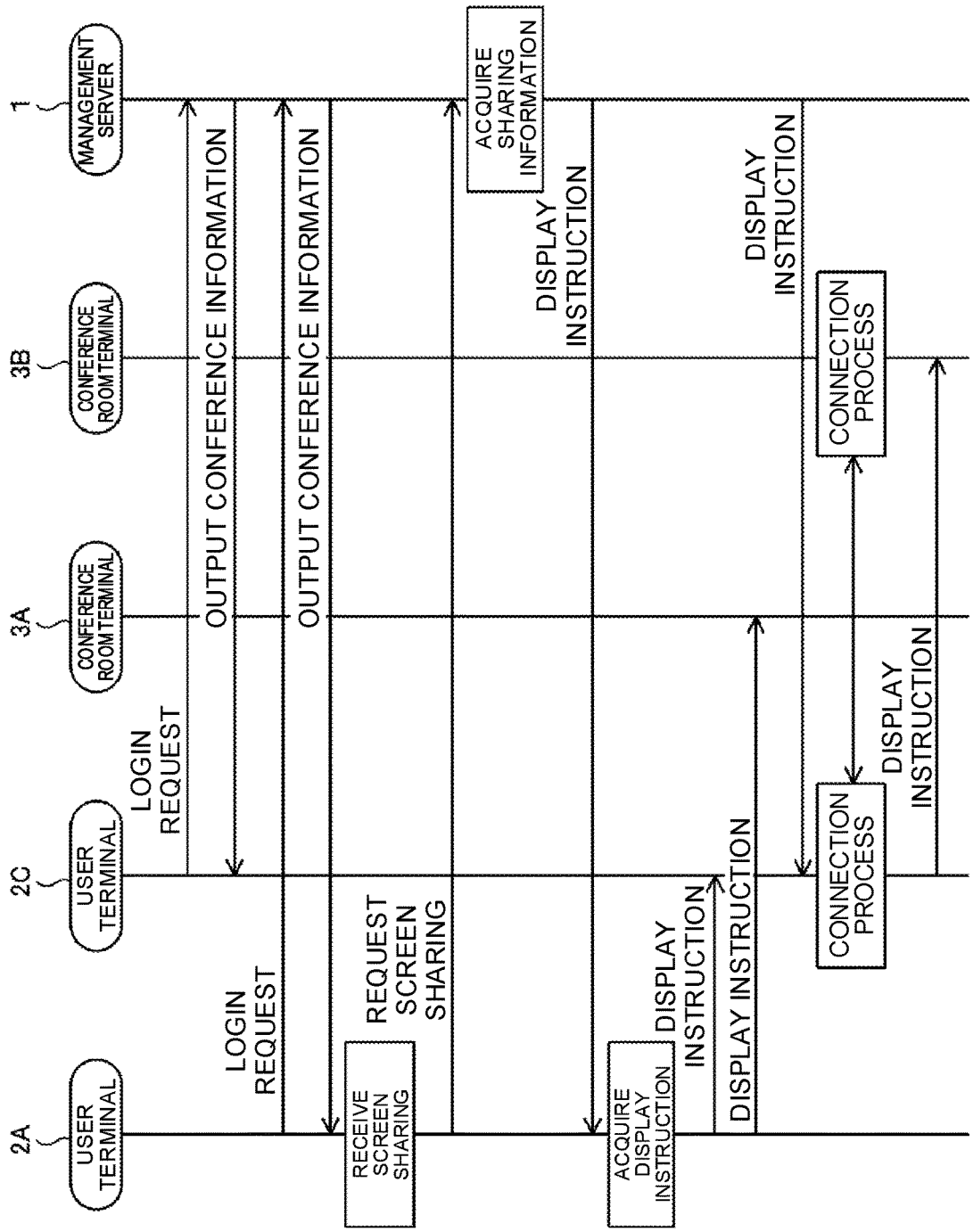

INFORMATION PROCESSING SYSTEM, INFORMATION PROCESSING METHOD, AND RECORDING MEDIUM RECORDING INFORMATION PROCESSING PROGRAM

INCORPORATION BY REFERENCE

This application is based upon and claims the benefit of priority from the corresponding Japanese Patent Application No. 2020-096632 filed on Jun. 3, 2020, the entire contents of which are incorporated herein by reference.

BACKGROUND

The present disclosure relates to an information processing system, an information processing method, and a recording medium which records the information processing program.

Conventionally, in a conference in which a plurality of users (conference participants) participate, a conference system has been used in which materials (files) for the conference are displayed on a display installed in the conference room so that the plurality of users can view or write information (see, for example, Patent Document 1). In the conference system, it is also possible to connect a plurality of conference rooms to a network so that the display screen displayed on a predetermined user terminal can be shared and displayed on the display of each conference room.

In this case, when the screen of the user terminal is shared by each of the displays, the screen is shared, for example, by connecting an HDMI (registered trademark) cable or the like to the display installed in the conference room where the user terminal is arranged. Then, the display installed in the conference room at a remote place is made to share the screen by using a predetermined screen sharing application, a web conferencing application, or the like. In this manner, when the display screen is shared by a plurality of display devices, this sharing is troublesome, because it is necessary to set the display method for each display device.

SUMMARY

An object of the present disclosure is to provide an information processing system, an information processing method, and a recording medium recording the information processing program which can improve operability when sharing a display screen by a plurality of display devices.

According to an aspect of the present disclosure, there is provided an information processing system including a reception processor which receives a display request for displaying a display screen of a first user terminal on one or a plurality of display devices, from the first user terminal of a first user among a plurality of users participating in a conference; a specifying processor which specifies a first display application for enabling the display screen to be shared by all users participating in the conference, of display applications which can be used in the first user terminal and the one or plurality of display devices, when the display request has been received by the reception processor; and an output processor which outputs a display instruction including information of the first display application specified by the specifying processor, to the first user terminal.

According to another aspect of the present disclosure, there is provided an information processing method to be executed by one or a plurality of processors, including the steps of: receiving a display request for displaying a display screen of a first user terminal on one or a plurality of display devices, from the first user terminal of a first user among a plurality of users participating in a conference; specifying a first display application for enabling the display screen to be shared by all users participating in the conference, of display applications which can be used in each of the first user terminal and the one or plurality of display devices, when the display request has been received by the receiving; and outputting a display instruction including information of the first display application specified by the specifying to the first user terminal.

According to another aspect of the present disclosure, there is provided a non-transitory computer readable recording medium which records an information processing program for controlling one or a plurality of processors to execute the steps of receiving a display request for displaying a display screen of a first user terminal on one or a plurality of display devices, from the first user terminal of a first terminal among a plurality of users participating in a conference; specifying a first display application for enabling the display screen to be shared by all users participating in the conference, of display applications which can be used in each of the first user terminal and the one or plurality of display devices, when the display request has been received by the receiving; and outputting a display instruction including information of the first display application specified by the specifying to the first user terminal.

According to the present disclosure, there is provided an information processing system, an information processing method, and a recording medium recording the information processing program which can improve operability when sharing a display screen by a plurality of display devices.

This Summary is provided to introduce a selection of concepts in a simplified form that are further described below in the Detailed Description with reference where appropriate to the accompanying drawings. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

BRIEF DESCRIPTION OF THE DRAWINGS

FIG. 3 is a diagram illustrating an example of conference information used in the conference system according to the embodiment of the present disclosure.

FIG. 4 is a diagram illustrating an example of conference room information used in the conference system according to the embodiment of the present disclosure.

FIG. 5 is a diagram illustrating an example of user information used in the conference system according to the embodiment of the present disclosure.

FIG. 6 is a diagram illustrating an example of user terminal information used in the conference system according to the embodiment of the present disclosure.

FIG. 7 is a diagram illustrating an example of conference room terminal information used in the conference system according to the embodiment of the present disclosure.

FIG. 8 is a diagram illustrating an example of application information used in the conference system according to the embodiment of the present disclosure.

FIG. 9 is a sequence diagram for explaining an example of the procedure of a conference support process executed in the conference system according to the embodiment of the present disclosure.

FIG. 13 is a sequence diagram for explaining an example of a procedure of the conference support process executed in the conference system according to another embodiment of the present disclosure.

DETAILED DESCRIPTION

Preferred embodiments of the present disclosure will hereinafter be described with reference to the accompanying drawings. The following embodiments are examples embodying the present disclosure, and do not intend to limit the technical scope of the present disclosure.

The information processing system according to the present disclosure can be applied to, for example, a conference in which a plurality of users participate in a plurality of places (conference rooms), a conference in which a plurality of users participate in one place (conference room), and the like. The conference system according to the present embodiment is an example of the information processing system according to the present invention. For example, in the conference system according to the present embodiment, arranged in a plurality of conference rooms are at least one user terminal used by each user participating in a conference and a conference room terminal (one example of a display device of the present invention) capable of displaying a display screen of the user terminal.

Conference System 100

Figure 1:
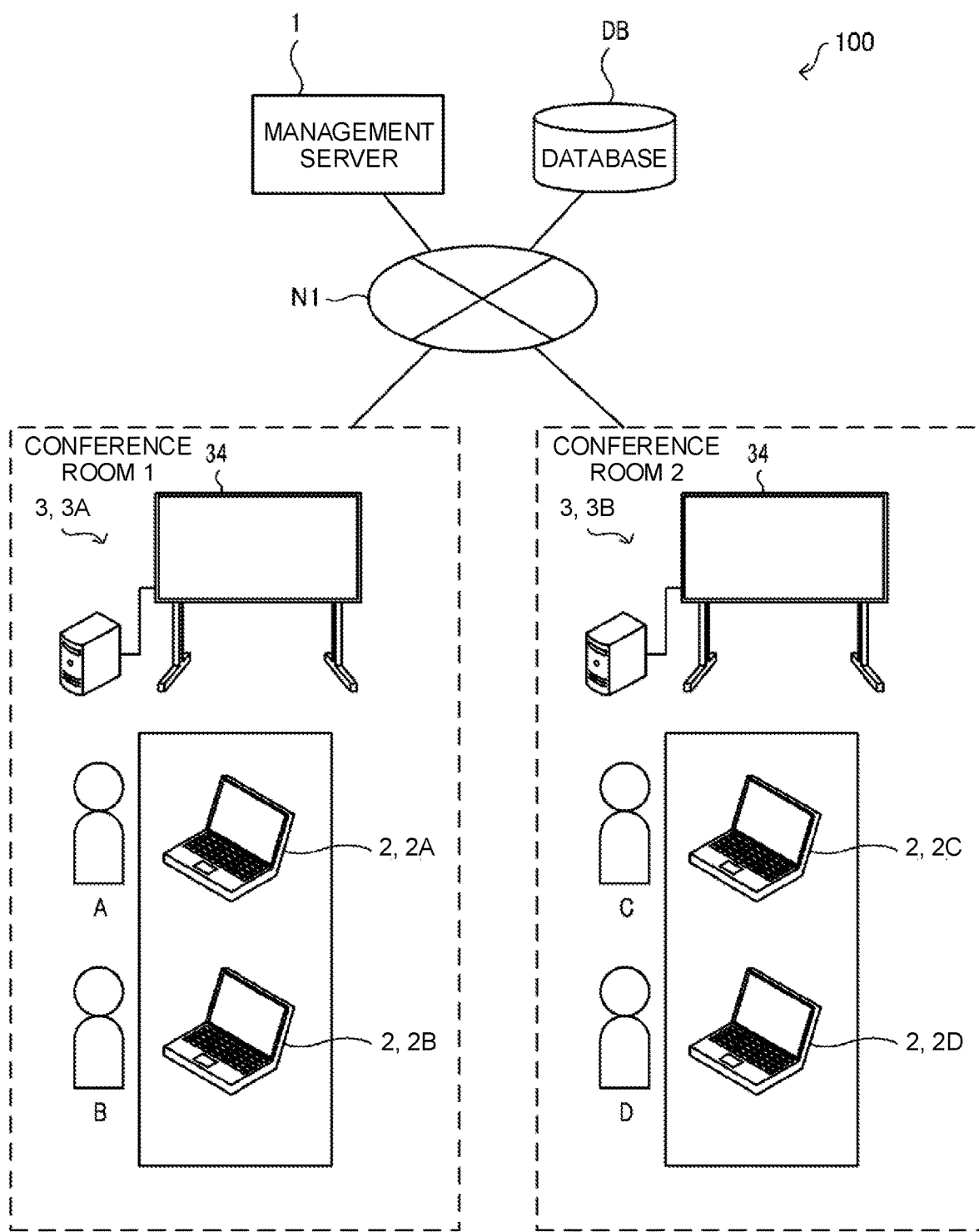
FIG. 1 is a schematic diagram illustrating a schematic configuration of a conference system according to an embodiment of the present disclosure.

FIG. 1 is a diagram illustrating a schematic configuration of a conference system according to an embodiment of the present disclosure. A conference system 100 includes a management server 1, a user terminal 2, a conference room terminal 3, and a database DB. FIG. 1 illustrates two conference rooms 1 and 2. In the conference room 1, there are arranged a user terminal 2A, a user terminal 2B used by a user B, and a conference room terminal 3A. The user terminal 2A is used by a user A who is a participant of the conference. In the conference room 2, there are arranged a user terminal 2C, a user terminal 2D used by a user D, and a conference room terminal 3B. The user terminal 2C is used by a user C who is a participant of the conference.

The management server 1 is constructed with, for example, one or a plurality of servers (virtual servers). A database DB stores various data. The database DB may be included in the management server 1 or the conference room terminal 3, or may be distributed and included in these devices. The user terminal 2 may be his/her own mobile terminal (personal computer, smartphone, etc.) brought into the conference room by a user who participates in the conference, or may be a computer installed in the conference room.

The management server 1, the user terminal 2, the conference room terminal 3, and the database DB are connected to each other via a network N1. The network N1 is a communication network such as the Internet, LAN, WAN, or public telephone line.

Management Server 1

Figure 2:
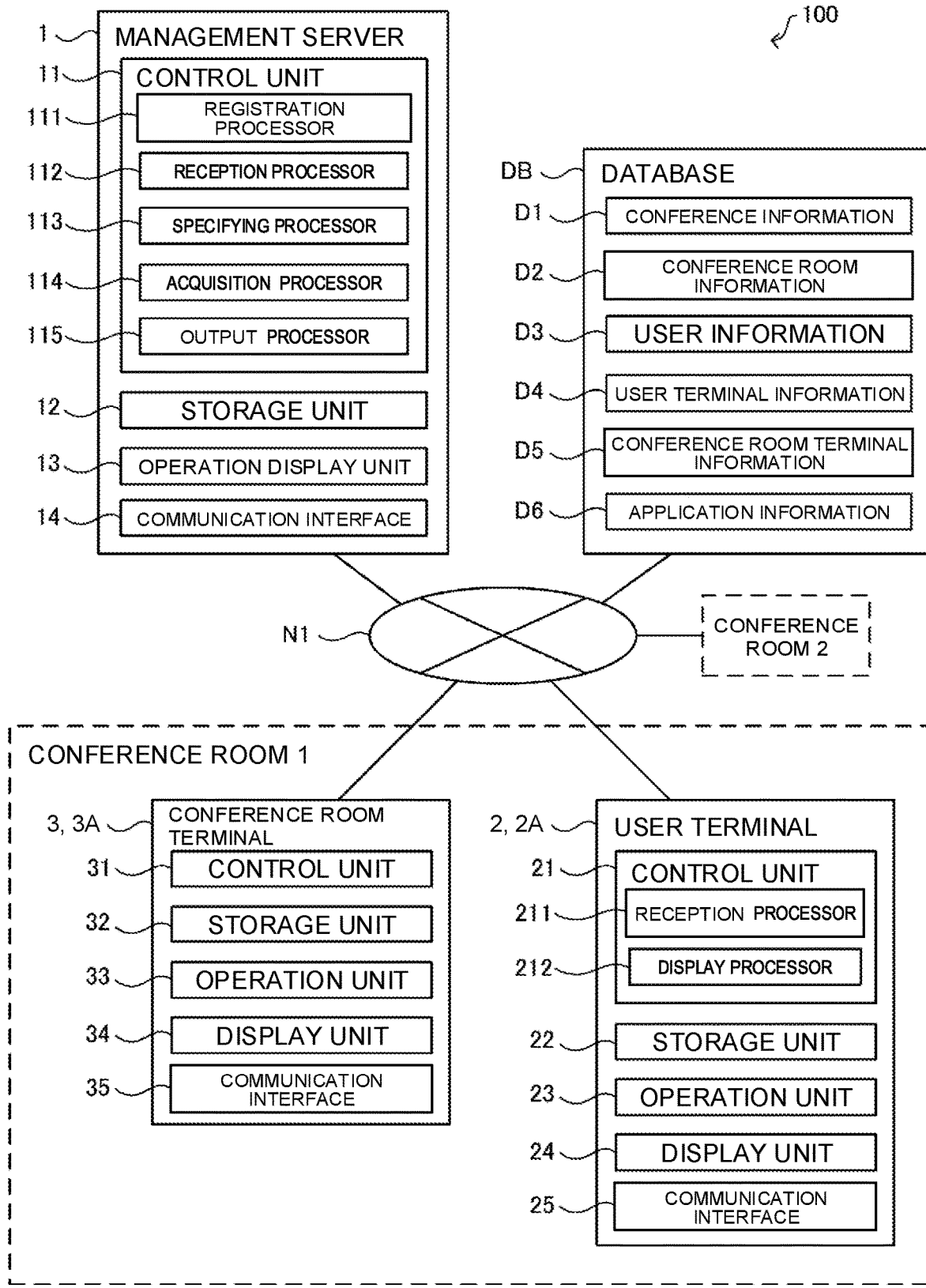
FIG. 2 is a functional block diagram illustrating a configuration of a conference system according to the embodiment of the present disclosure.

As illustrated in FIG. 2, the management server 1 includes a control unit 11, a storage unit 12, an operation display unit 13, a communication interface 14, and the like. The management server 1 may be one or a plurality of virtual servers (cloud servers), or may be one or a plurality of physical servers.

The communication interface 14 is a communication interface for connecting the management server 1 to the network N1 by wire or wirelessly and executing data communication with another device (for example, the user terminal 2, the conference room terminal 3, and a database DB) according to a predetermined communication protocol via the network N1.

The operation display unit 13 is a user interface including a display unit and an operation unit. The display unit such as a liquid crystal display or an organic EL display displays various information, whereas the operation unit such as a mouse, keyboard, or touch panel receives operations.

The storage unit 12 is a non-volatile storage unit such as flash memory storing various type of information. The storage unit 12 stores a control program such as a conference support program for causing the control unit 11 to execute the conference support process described later. For example, the conference support program is non-temporarily recorded on a computer-readable recording medium such as a CD or DVD, and may be read by a reading device (not shown) such as a CD drive or a DVD drive included in the management server 1, so as to be stored in the storage unit 12.

The control unit 11 includes control devices such as a CPU, ROM, and RAM, etc. The CPU is a processor that executes various types of arithmetic processes. The ROM stores a control program in advance, such as BIOS and OS, etc. for causing the CPU to execute various types of processes. The RAM stores various information and is used as a temporary storage memory (work area) for the various processes executed by the CPU. The control unit 11 controls the management server 1 by causing the CPU to execute various types of control programs stored in advance in the ROM or the storage unit 12.

Further, the control unit 11 refers to the database DB and executes various processes. The database DB stores data such as conference information D1, conference room information D2, user information D3, user terminal information D4, conference room terminal information D5, and application information D6, etc.

FIG. 3 illustrates an example of the conference information D1. The conference information D1 includes information items, such as the corresponding "conference ID", "conference name", "location (conference room ID)", "start date and time", "end date and time", and "participant ID (user ID)", "attached file" (schedule information) that are registered in association with each other. The "conference ID" is the identification information of the conference, the "conference name" is the name (subject) of the conference, and the "conference room ID" is the identification information of the conference room. The "start date and time" represents the start date and time of the conference, while the "end date and time" represents the end date and time of the conference. The "participant ID" is identification information (user ID) of a user who participates in the conference. The "attached file" is the file name of the file (material) used for the conference, and the file data corresponding to the attached file is stored in the database DB. When the conference schedule is decided, the conference information D1 is registered in advance in accordance with a registration operation by a person in charge, etc. In FIG. 3, a user A ("U001"), a user B ("U002"), a user C ("U003"), and a user D ("U004") are registered as participants of a conference X which is held in a conference room 1 ("R01") and a conference room 2 ("R02") from 13:00 to 14:00.

FIG. 4 illustrates an example of the conference room information D2. The conference room information D2 includes information items such as corresponding "conference room ID", "conference room name", and "conference room terminal ID" that are registered, in association with each other and each conference room. The "conference room ID" is the identification information of the conference room, and the "conference room name" is the name of the conference room. The "conference room terminal ID" is identification information of the conference room terminal 3 installed in the conference room. For example, when the conference room terminal 3A is installed in the conference room 1, the identification information "S001" of the conference room terminal 3A is registered as the conference room terminal ID corresponding to the conference room 1. Similarly, when the conference room terminal 3B is installed in the conference room 2, the identification information "S002" of the conference room terminal 3B is registered as the conference room terminal ID corresponding to the conference room 2.

FIG. 5 illustrates an example of user information D3. The user information D3 includes information items such as the corresponding "user ID", "user name", "password", and "conference room ID for participation", etc. that are registered in association with each other and each user. The user information D3 includes information that is registered in advance and relates not only to all users who participate in the conference, but also all users who have the authority to use the conference system 100. For example, the information of all employees of the company may be registered in the user information D3. The "user ID" is the user's identification information, and the "user name" represents the user's name. The "user ID" and "password" are information used to login to the system when a user joins a conference.

For example, a user who participates in a conference starts a conference support application on his/her own user terminal 2 when starting a conference, and inputs the user ID and the password, which are login information on the login screen. The management server 1 performs a login process based on the login information. When the conference room in which the conference is held is licensed for the conference support application, the logged-in user can participate in the conference using the conference support application.

FIG. 6 illustrates an example of the user terminal information D4. The user terminal information D4 includes information items such as the corresponding "user ID", "IP address", "installed application", and "application connection information" registered, in association with each other and each user terminal 2. The "user ID" is the identification information of the user who owns the user terminal 2. The "installed application" is identification information of a conference application installed on the user terminal 2 and identification information of a screen sharing application (corresponding to the display application of the present disclosure) that enables sharing of the screen displayed on the user terminal 2. Reference symbols "A001" and "A002" indicate screen sharing applications that are different from each other. Further, for example, when the display screen displayed on the user terminal 2 can be displayed (screen sharing) on the conference room terminal 3 by an HDMI cable, "HDMI" is registered in the "installed application" of the user terminal 2. The "application connection information" is connection information (IP address, PIN number, etc.) for connecting to the user terminal 2 that uses the screen sharing application. In the "application connection information", connection information is registered which is different for each screen sharing application.

FIG. 7 illustrates an example of the conference room terminal information D5. The conference room terminal information D5 includes information items such as the corresponding "conference room terminal ID", "IP address", "installed application", and "application connection information" that are registered, in association with each other and each conference room terminal 3. The "conference room terminal ID" is the identification information of the conference room terminal 3. The "installed application" is identification information of a conference application installed in the conference room terminal 3, and is identification information of the screen sharing application that enables sharing of the screen displayed on the conference room terminal 3. The reference symbols "A001" and "A002" indicate different types of screen sharing applications. Further, for example, when the display screen displayed on the user terminal 2 can be displayed (screen shared) on the conference room terminal 3 via the HDMI cable, "HDMI" is registered in the "installed application" of the conference room terminal 3. The "application connection information" is connection information (authentication information) for connecting to the conference room terminal 3 that uses the screen sharing application. In the "application connection information", connection information is registered, which is different for each screen sharing application.

FIG. 8 illustrates an example of application information D6. The application information D6 includes information items such as the corresponding "screen sharing application ID", "compatible application ID", and "restriction information" that are registered, in association with each other and each screen sharing application. The "screen sharing application ID" is the identification information of the screen sharing application. The "compatible application ID" is identification information of the screen sharing application compatible with the screen sharing application. The "restriction information" is information regarding connection restrictions of the screen sharing application, and includes, for example, the number of simultaneous connections registered.

Note that some or all of the information such as the conference information D1, the conference room information D2, the user information D3, the user terminal information D4, the conference room terminal information D5, and the application information D6 may be stored in any of the management server 1, the user terminal 2, and the conference room terminals 3, or may be distributed and stored in the plurality of devices. Further, each of the above information may be stored in a server accessible from the conference system 100. In this case, the conference system 100 may acquire the respective information from the server and execute each process such as the conference support process described later.

As illustrated in FIG. 2, the control unit 11 includes various processors such as a registration processor 111, a reception processor 112, a specifying processor 113, an acquisition processor 114, and an output processor 115, etc. The control unit 11 functions as the various types of processors by causing the CPU to execute various types of processes according to the control program. Furthermore, some or all of the processors included in the control unit 11 may be configured with an electronic circuit. The control program may be a program for causing a plurality of processors to function as the various processors.

The registration processor 111 registers each information of the conference information D1, the conference room information D2, the user information D3, the user terminal information D4, the conference room terminal information D5, and the application information D6. Specifically, the registration processor 111 registers each of the above information in the database DB based on the user's registration operation. Note that when the registration processor 111 recognizes the user terminal 2 arranged in the conference room, for example, it may acquire the information of the user terminal 2 and register the user information D3. Further, when the registration processor 111 recognizes the conference room terminal 3 arranged in the conference room, for example, the registration processor 111 may acquire the information of the conference room terminal 3 and register the conference room information D2.

The reception processor 112 receives various requests from the user terminal 2. Specifically, the reception processor 112 receives a login request from the user terminal 2, when the login operation is performed on the user terminal 2. When the reception processor 112 receives the login request, the reception processor 112 performs a login process based on the login information (user ID, password, etc.). When the reception processor 112 authenticates the user in the login process, the reception processor 112 acquires the conference information associated with the user ID of the user from the conference information D1 and outputs the conference information to the user terminal 2.

When the user terminal 2 acquires the conference information, it executes a determination process regarding whether or not to participate in the conference. For example, the user terminal 2 determines in the conference information whether or not a reservation has been made for the conference in which the user of the user terminal 2 participates, whether or not the conference room for holding the conference has been set, and the like. When these conditions are satisfied, the control unit 11 of the management server 1 permits the user terminal 2 to participate in the conference. The determination process is executed on each user terminal 2 that outputs the login request, and the control unit 11 determines whether or not each user terminal 2 can participate in the conference.

Here, when the conference has not been reserved in the conference information, the user terminal 2 may execute a process for starting another type of conference (for example, an ad-hoc conference).

In addition, when the conference is started and a predetermined screen sharing operation (described later) is performed on the user terminal 2, the reception processor 112 receives the screen sharing request from the user terminal 2. Specifically, the reception processor 211 receives the screen sharing request, when a predetermined operation is performed by the user on the operation screen displayed on the user terminal 2. The reception processor 112 is an example of the reception processor of the present disclosure. The screen sharing request is an example of the display request of the present disclosure.

When the screen sharing request is received by the reception processor 112, the specifying processor 113 specifies a screen sharing application (hereinafter, referred to as "a first screen sharing application") that enables all participating users to share the display screen of the user terminal 2, of the screen sharing applications available in each of the user terminal 2 and one or a plurality of conference room terminals 3. Specifically, the specifying processor 113 specifies the first screen sharing application for causing the display screen of the user terminal 2 to be shared with other devices (the conference room terminal 3, user terminal 2), based on the screen sharing request acquired by the reception processor 112. The first screen sharing application is an example of the first display application of the present disclosure.

In particular, when the specifying processor 113 acquires the screen sharing request, it identifies another user who participates in the conference in which the user of the user terminal 2 who has output the screen sharing request. In addition, the specifying processor 113 specifies the location of the other user (participation location; conference room, his/her own seat, etc.).

For example, the specifying processor 113 specifies the other user with reference to the conference information D1 (see FIG. 3), and specifies location of the other user (conference room ID) with reference to the user information D3 (see FIG. 5). Further, the specifying processor 113 specifies the conference room terminal 3 installed at the location (conference room) of each user who participates in the conference with reference to the conference room information D2 (see FIG. 4). For example, when a plurality of users participate in a conference in a plurality of different conference rooms, the specifying processor 113 specifies all the conference room terminals 3 installed in the conference room of each of the users, with reference to the conference room information D2 (see FIG. 4). That is, the specifying processor 113 specifies the locations of all the users who participate in the conference, and specifies the conference room terminals 3 installed at the specified location.

Next, the specifying processor 113 specifies a screen sharing application that can be used in the conference room terminal 3 in association with each of the specified conference room terminals 3, with reference to the conference room terminal information D5 (see FIG. 7). Note that the installed application registered in the conference room terminal information D5 corresponds to the screen sharing application that can be used in the conference room terminal 3.

Next, the specifying processor 113 specifies a screen sharing application that can be used in the user terminal 2 that has made the screen sharing request, with reference to the user terminal information D4 (see FIG. 6). The installed application registered in the user terminal information D4 corresponds to the screen sharing application that can be used in the user terminal 2.

Then, the specifying processor 113 specifies one or a plurality of first screen sharing applications that can be used in each conference room terminal 3 and user terminal 2, of one or a plurality of screen sharing applications that is available in each conference room terminal 3 and the screen sharing application that is available in the user terminal 2 that has made the screen sharing request. In particular, the specifying processor 113 specifies one or a plurality of first screen sharing applications that are common to or compatible with each other and available in one or a plurality of conference room terminals 3 and the user terminal 2, with reference to the user terminal information D4 and the conference room terminal information D5. In addition, the specifying processor 113 specifies connection information (IP address, PIN number, etc.) for connecting to the one or a plurality of conference room terminals 3 that can use the first screen sharing application. The specifying processor 113 is an example of the specifying processor of the present disclosure.

The acquisition processor 114 acquires the identification information of the first screen sharing application and the connection information for causing the conference room terminal 3 at a screen sharing destination to share the screen. Specifically, the acquisition processor 114 acquires the identification information of the one or plurality of first screen sharing applications specified by the specifying processor 113 and the connection information (IP address, PIN number, etc.) for connecting to one or a plurality of conference room terminals 3, from the user terminal information D4 (see FIG. 6) and the conference room terminal information D5 (see FIG. 7).

The output processor 115 outputs a display instruction including the identification information of the first screen sharing application acquired by the acquisition processor 114 and the connection information to the user terminal 2 that has made the screen sharing request. Specifically, the output processor 115 outputs, to the user terminal 2, the display instruction including the identification information of the first screen sharing application and the connection information for connecting the user terminal 2 and the conference room terminal 3. As another embodiment, the output processor 115 may output the display instruction to the user terminal 2 that has made the screen sharing request and to the conference room terminal 3 installed in the conference room in which the user terminal 2 is arranged. Further, as another embodiment, the output processor 115 may output the display instruction to the user terminal 2 that has made the screen sharing request and to another user terminal 2 that is arranged in the conference room in which the user terminal 2 is arranged. The output processor 115 is an example of the output processor of the present disclosure.

[User Terminal 2]

As illustrated in FIG. 2, the user terminal 2 includes a control unit 21, a storage unit 22, an operation unit 23, a display unit 24, a communication interface 25, and the like. FIG. 1 illustrates examples of the user terminal 2A and the user terminal 2B of the respective users A and B who participate in the conference in the conference room 1 and the user terminal 2C and the user terminal 2D of the respective users C and D who participate in the conference in the conference room 2. The user terminals 2A, 2B, 2C, and 2D have the same functions as each other.

The communication interface 25 is a communication interface for connecting the user terminal 2 to the network N1 by wire or wirelessly and executing data communication with another device (for example, the management server 1, the conference room terminal 3, and the database DB) according to a predetermined communication protocol via the network N1.

The operation unit 23 is a mouse, keyboard, touch panel, or the like that receives operations of a user who uses the user terminal 2. The display unit 24 is a display panel such as a liquid crystal display or an organic EL display that displays various types of information. The operation unit 23 and the display unit 24 may be an integrally-formed user interface.

The storage unit 22 is a non-volatile storage unit such as a flash memory storing various type of information. The storage unit 22 stores a control program such as a conference support program for causing the control unit 21 to execute a conference support process, as will be described later. For example, the conference support program may be non-temporarily recorded on a computer-readable recording medium such as a CD or DVD, and read by a reading device (not shown) such as a CD drive or a DVD drive included in the user terminal 2, so as to be stored in the storage unit 22.

Further, one or a plurality of the screen sharing applications are installed and stored in the storage unit 22. The information of the screen sharing application installed on the user terminal 2 is registered in the user terminal information D4 (see FIG. 6) of the management server 1.

The control unit 21 includes control devices such as a CPU, ROM, and RAM, etc. The CPU is a processor that executes various types of arithmetic processes. The ROM stores a control program in advance, such as BIOS and OS, etc. for causing the CPU to execute various types of processes. The RAM stores various information and is used as a temporary storage memory (work area) for the various processes executed by the CPU. The control unit 21 then controls the user terminal 2 by causing the CPU to execute various types of control programs stored in advance in the ROM or the storage unit 22.

Specifically, the control unit 21 includes various processors such as a reception processor 211 and a display processor 212. The control unit 21 functions as the various types of processors by causing the CPU to execute various types of processes according to the control program. Furthermore, some or all of the processors included in the control unit 21 may be configured by an electronic circuit. The control program may be a program for causing a plurality of processors to function as the various processors.

The reception processor 211 receives various operations from the user. For example, the reception processor 211 receives an operation for invoking the conference support application from the user. For example, when the conference X is started in the conference room 1, if the user A performs an operation to invoke the conference support application on the user terminal 2A, the reception processor 211 receives the operation. Further, when the user A performs an operation of inputting the user ID and the password on the login screen of the conference support application, the reception processor 211 acquires the user ID and the password. When the reception processor 211 acquires the user ID and the password, it outputs a login request to the management server 1, and when the management server 1 acquires the login request, the reception processor 211 performs the login process based on the login information.

Further, when the conference is started, the reception processor 211 receives the screen sharing operation on the user terminal 2. Specifically, when the conference is started, the control unit 21 displays a screen sharing button on the operation screen of the conference support application. The screen sharing button is displayed on the user terminal 2 of all users who are permitted to participate in the conference. When the user presses the screen sharing button, the reception processor 211 receives the screen sharing operation. When the reception processor 211 receives the screen sharing operation, the reception processor 211 outputs the screen sharing request to the management server 1. When the management server 1 acquires the screen sharing request, it executes the process of specifying the first screen sharing application and the connection information as described above.

The display processor 212 executes a display process for displaying the display screen (sharing the screen) displayed on the user terminal 2 on the conference room terminal 3. Specifically, when the display processor 212 acquires the display instruction including the identification information of the first screen sharing application and the connection information (IP address, PIN number, etc.) from the management server 1, it outputs a display instruction for displaying the display screen displayed on the user terminal 2 in accordance with the first screen sharing application, to the conference room terminal 3 specified using the connection information.

As another embodiment, when the display processor 212 acquires the display instruction from the management server 1, it may output the display instruction to another user terminal 2 to cause the display process to be executed on the conference room terminal 3 through the other user terminal 2. That is, the display processor 212 may cause the conference room terminal 3 to execute the display process via another user terminal 2.

Further, the display processor 212 outputs the display instruction including display data of the display screen being displayed by the display unit 24 of the user terminal 2. The display data may be image data obtained by capturing the display screen of the display unit 24, or may be data stored in the storage unit 22 of the user terminal 2.

Conference Room Terminal 3

As illustrated in FIG. 2, the conference room terminal 3 includes a control unit 31, a storage unit 32, an operation unit 33, a display unit 34, a communication interface 35, and the like. FIG. 1 illustrates an example of a conference room terminal 3A installed in the conference room 1 and a conference room terminal 3B installed in the conference room 2. The conference room terminals 3A and 3B are, for example, display devices having the same functions as each other.

The communication interface 35 is a communication interface for connecting the conference room terminal 3 to the network N1 by wire or wirelessly and executing data communication with another device (for example, the management server 1, the user terminal 2, and the database DB) via the network N1 according to a predetermined communication protocol.

The operation unit 33 is a mouse, keyboard, touch panel, or the like that receives user operations. The display unit 34 is a display panel such as a liquid crystal display or an organic EL display that displays various types of information. The operation unit 33 and the display unit 34 may be an integrally-formed user interface.

The storage unit 32 is a non-volatile storage unit such as a flash memory storing various type of information. The storage unit 32 stores a control program such as a conference support program for causing the control unit 31 to execute a conference support process, as will be described later. For example, the conference support program may be non-temporarily recorded on a computer-readable recording medium such as a CD or DVD, and may be read by a reading device (not shown) such as a CD drive or a DVD drive included in the conference room terminal 3 so as to be stored in the storage unit 32.

Further, one or a plurality of the screen sharing applications are installed and stored in the storage unit 32. The information of the screen sharing application installed in the conference room terminal 3 is registered in the conference room terminal information D5 (see FIG. 7) of the management server 1.

The control unit 31 includes control devices such as a CPU, ROM, and RAM, etc. The CPU is a processor that executes various types of arithmetic processes. The ROM stores a control program in advance, such as BIOS and OS, etc. for causing the CPU to execute various types of processes. The RAM stores various information and is used as a temporary storage memory (work area) for the various processes executed by the CPU. The control unit 31 then controls the conference room terminal 3 by causing the CPU to execute various types of control programs stored in advance in the ROM or the storage unit 32.

Specifically, the control unit 31 executes a display process when a display instruction is acquired from the user terminal 2. Specifically, when the control unit 31 acquires the display instruction including the identification information of the screen sharing application and the display data from the user terminal 2, the control unit 31 invokes the corresponding screen sharing application to display an image corresponding to the display data on the display unit 34.

As another embodiment, when the control unit 31 acquires the display instruction from the management server 1, the control unit 31 invokes the corresponding screen sharing application to display an image corresponding to the display data on the display unit 34, based on the display instruction.

Conference Support Process

Hereinafter, descriptions will be made to an example of the procedure of the conference support process executed in the conference system 100.

The present disclosure can be regarded as a disclosure of a conference support processing method (an example of the information processing method of the present disclosure) that executes one or a plurality of steps included in the conference support processing. One or a plurality of steps included in the conference support process described here may be omitted as appropriate. Further, the execution order of each step in the conference support process may differ within a range that exerts the same action and effect. Further, descriptions will herein be made to a case where each step in the conference support process is executed by each control unit of the devices (management server 1 and user terminal 2) included in the conference system 100 as an example. However, as another embodiment, each step in the conference support process may be distributed and executed by one or a plurality of processors.

Descriptions will herein be made to a conference support process corresponding to the conference X held in the conference room 1 described above, as an example. FIG. 9 is a sequence diagram illustrating an example of the procedure of the conference support process when the display screen of the user terminal 2A is displayed on the conference room terminals 3A and 3B. The user terminal 2A is an example of a first user terminal of the present disclosure.

First, the users A and B who participate in the conference X in the conference room 1 perform a login operation on their own user terminals 2A and 2B. Each of the user terminals 2A and 2B outputs a login request to the management server 1 when the login information is acquired from the users A and B. When the management server 1 acquires the login request, the management server 1 performs the login process based on the login information. When the management server 1 authenticates the users A and B, the management server 1 acquires the conference information associated with the user IDs ("U001" and "U002") of the users A and B from the conference information D1 (see FIG. 3), and outputs the acquired conference information to each of the user terminals 2A and 2B. In each of the user terminals 2A and 2B, it is determined whether or not the conference in which the users of each user terminal 2 participate has been reserved, and whether or not the conference room for holding the conference has been set. When these conditions are satisfied, the control unit 11 of the management server 1 permits each user terminal 2 to participate in the conference to start the conference.

When the conference is started, and if, for example, the user A presses the screen sharing button displayed on the user terminal 2A, the user terminal 2A receives the screen sharing operation and outputs the screen sharing request to the management server 1.

When the management server 1 acquires the screen sharing request, as described above, it executes a process of specifying the first screen sharing application for sharing the display screen of the user terminal 2A with the conference room terminal 3 and a process of specifying connection information (IP address, PIN number, etc.) for connecting to the conference room terminal 3. Then, the management server 1 acquires the identification information of the first screen sharing application and the connection information for causing the conference room terminal 3 at a screen sharing destination to share the screen. The shared information illustrated in FIG. 9 represents the identification information of the first screen sharing application and the connection information.

When the management server 1 acquires the identification information of the first screen sharing application and the connection information, it outputs a display instruction including these information to the user terminal 2A that has made the screen sharing request.

When the user terminal 2A acquires the display instruction from the management server 1, it outputs a display instruction for displaying the display screen displayed on the user terminal 2A in accordance with the first screen sharing application, to the conference room terminals 3A and 3B specified based on the connection information. For example, the user terminal 2A outputs a display instruction for displaying the display screen displayed on the user terminal 2A in accordance with the screen sharing application "A001" to the conference room terminal 3A, and outputs a display instruction for displaying the display screen displayed on the user terminal 2A in accordance with the screen sharing application "A002" to the conference room terminal 3B.

When the conference room terminal 3A acquires the display instruction from the user terminal 2A, the conference room terminal 3A invokes the screen sharing application "A001" to display an image corresponding to the display data of the display screen of the user terminal 2A on the display unit 34. When the conference room terminal 3B acquires the display instruction from the user terminal 2A, the conference room terminal 3B invokes the screen sharing application "A002" to display an image corresponding to the display data of the display screen of the user terminal 2A on the display unit 34.

By the above process, the display screen of the user terminal 2A can be displayed on each of the conference room terminals 3A and 3B installed in the conference rooms 1 and 2, so that users A, B, C, and D in the conference rooms 1 and 2 can share the display screen of the user terminal 2A.

Figure 10:
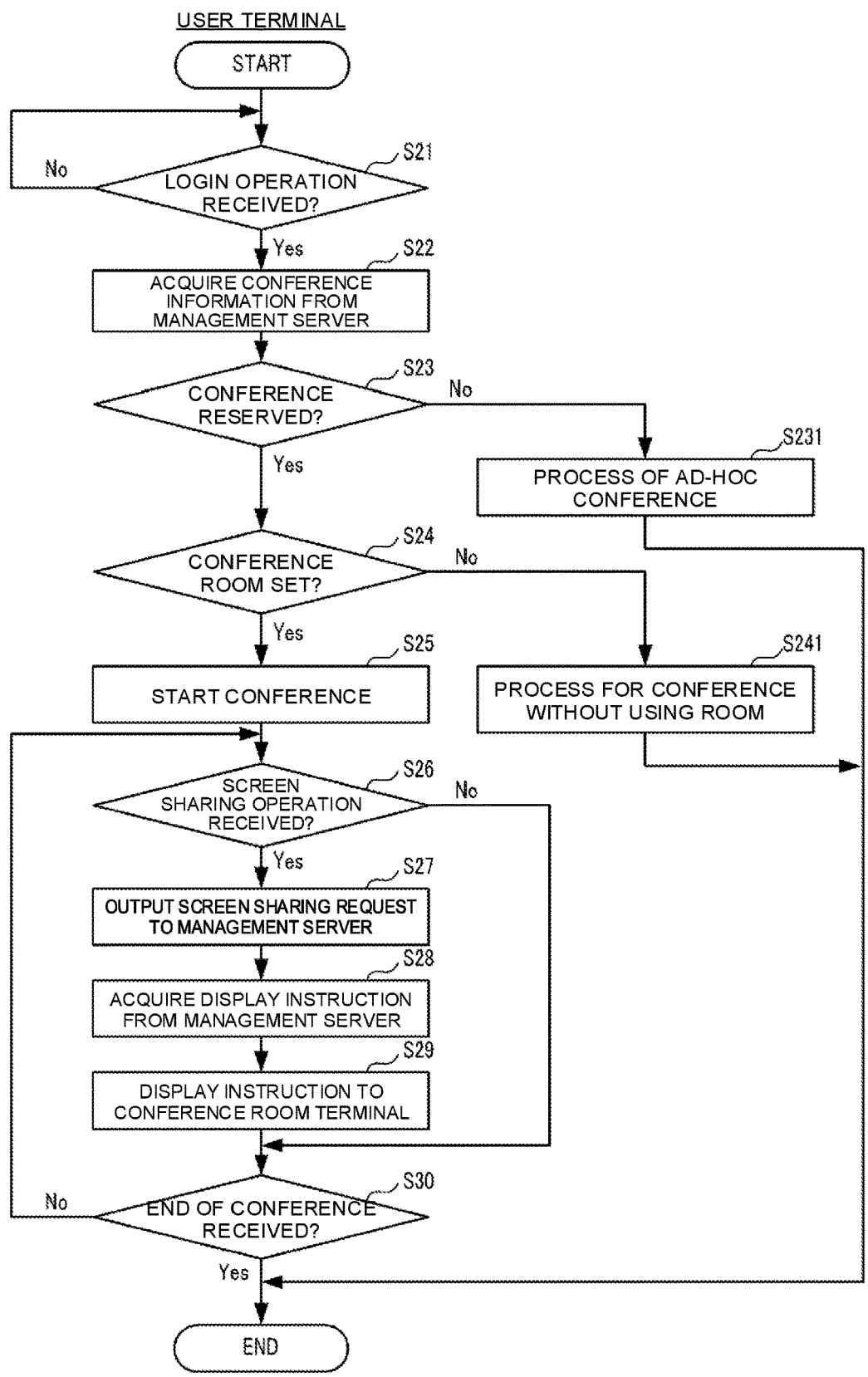
FIG. 10 is a flowchart for explaining an example of a procedure of the conference support process executed by the user terminal of the conference system according to the embodiment of the present disclosure.
Figure 11:
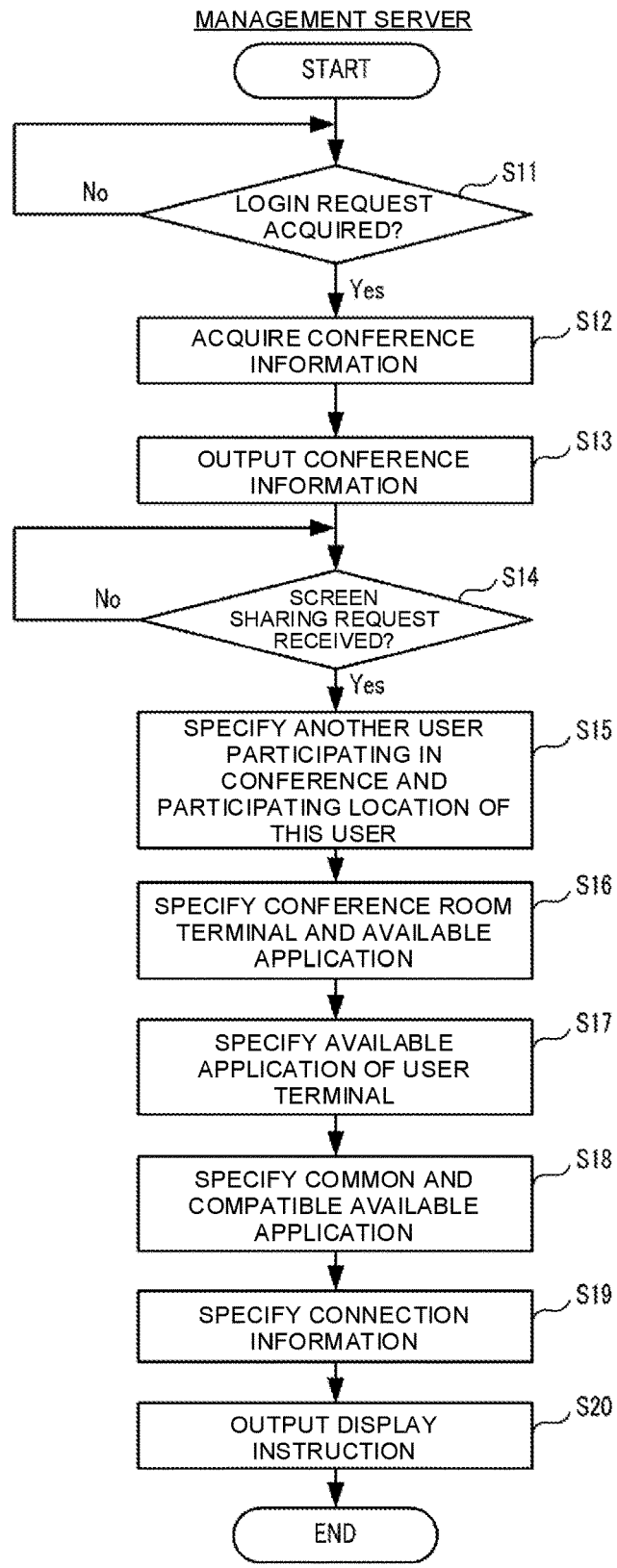
FIG. 11 is a flowchart for explaining an example of the procedure of the conference support process executed by the management server of the conference system according to the embodiment of the present disclosure.

Next, descriptions will now be made to an example of the procedure of the conference support process executed in each of the user terminal 2 and the management server 1. FIG. 10 illustrates an example of the procedure of the conference support process executed on the user terminal 2. FIG. 11 illustrates an example of the procedure of the conference support process executed on the management server 1.

As illustrated in FIG. 10, in the user terminal 2, in Step S21, the control unit 21 first determines whether or not a login operation has been received from the user on the login screen of the conference support application. When the control unit 21 receives a login operation from the user (S21: Yes), the process proceeds to Step S22. The control unit 21 waits until the login operation is received (S21: No). When the control unit 21 receives the login operation, the control unit 21 outputs a login request to the management server 1. When the management server 1 performs the login process, the management server 1 outputs the conference information to the user terminal 2.

In Step S22, the control unit 21 acquires the conference information from the management server 1. Next, in Step S23, the control unit 21 determines whether or not the conference in which the user of the user terminal 2 participates has been reserved, that is, whether or not the information of the conference has been registered in the conference information D1 (see FIG. 3). If the conference has been reserved (S23: Yes), the process proceeds to Step S24. On the other hand, if the conference has not been reserved (S23: No), the process proceeds to Step S231. In Step S231, the control unit 21 executes a process for starting another type of conference (for example, an ad-hoc conference), and ends the conference support process.

In Step S24, the control unit 21 determines whether or not the conference room for holding the conference has been set, that is, whether or not the information of the conference room has been registered in the conference information D1 (see FIG. 3). When the conference room has been set (S24: Yes), the process proceeds to Step S25. On the other hand, when the conference room has not been set (S24: No), the process proceeds to Step S241. In Step S241, a process of holding a conference that does not use the conference room is performed, and the conference support process is terminated.

In Step S25, the control unit 21 starts the conference. When the control unit 21 starts the conference, the control unit 21 displays the operation screen of the conference support application.

Next, in Step S26, the control unit 21 determines whether or not a screen sharing operation has been received from the user on the operation screen. For example, when the user presses the screen sharing button displayed on the operation screen, the control unit 21 determines that the screen sharing operation has been received. When the control unit 21 receives the screen sharing operation from the user (S26: Yes), the process proceeds to Step S27. When the control unit 21 does not receive the screen sharing operation from the user (S26: No), the process proceeds to Step S30.

In Step S27, the control unit 21 outputs the screen sharing request to the management server 1. When the management server 1 acquires the screen sharing request, it specifies the process of specifying the first screen sharing application and the process of specifying the connection information (IP address, PIN number, etc.) for connecting to the conference room terminal 3 as described above. Then, the management server 1 acquires the identification information of the first screen sharing application and the connection information for causing the conference room terminal 3 at a screen sharing destination to share the screen, and outputs a display instruction including these information items to the user terminal 2.

Next, in Step S28, the control unit 21 acquires the display instruction from the management server 1. Next, in Step S29, the control unit 21 outputs the display instruction to the conference room terminal 3 at a screen sharing destination corresponding to the connection information. When the conference room terminal 3 acquires the display instruction from the user terminal 2, the conference room terminal 3 invokes the screen sharing application specified by the display instruction, and displays an image corresponding to the display data of the display screen of the user terminal 2 on the display unit 34.

Next, in Step S30, the control unit 21 determines whether or not the user has received the end operation of the conference. When the control unit 21 receives the end operation from the user (S30: Yes), the conference support process ends. When the control unit 21 does not receive the end operation from the user (S30: No), the process returns to Step S26 and repeats the above process.

As illustrated in FIG. 11, in the management server 1, first in Step S11, the control unit 11 determines whether or not a login request has been acquired from the user terminal 2. When the control unit 11 acquires the login request from the user terminal 2 (S11: Yes), the process proceeds to Step S12. The control unit 11 waits until a login request is acquired (S11: No).

When the control unit 11 acquires the login request, the control unit 11 acquires the conference information in Step S12. Specifically, when the control unit 11 authenticates the user based on the login information (user ID, password, etc.), the control unit 11 acquires the conference information associated with the user from the conference information D1 (see FIG. 3). Next, in Step S13, the control unit 11 outputs the conference information to the user terminal 2 that has made the login request.

Next, in Step S14, the control unit 11 determines whether or not the screen sharing request has been acquired from the user terminal 2. When the control unit 11 acquires the screen sharing request from the user terminal 2 (S14: Yes), the process proceeds to Step S15. The control unit 11 waits until the screen sharing request is acquired (S14: No). Step S14 is an example of the reception step of the present disclosure.

In Step S15, the control unit 11 specifies the user of the user terminal 2 that has output the screen sharing request, another user who participates in the conference in which the user participates, and the location (conference room) of each user. Specifically, the control unit 11 refers to the conference information D1 (see FIG. 3) to specify the user who participates in the conference, and refers to the user information D3 (see FIG. 5) to specify the location of each user.

Next, in Step S16, the control unit 11 specifies the conference room terminal 3 installed at the location (conference room) of each user who participates in the conference and the screen sharing application available on the conference room terminal 3 in association with the specified conference room terminal 3. Specifically, the control unit 11 refers to the conference room information D2 (see FIG. 4) to specify all the conference room terminals 3 installed in the conference room of each user. Further, the control unit 11 refers to the conference room terminal information D5 (see FIG. 7) to specify an available screen sharing application in association with each conference room terminal 3.

Next, in Step S17, the control unit 11 refers to the user terminal information D4 (see FIG. 6) to specify a screen sharing application available in the user terminal 2 that has made the screen sharing request.

Next, in Step S18, the control unit 11 specifies one or a plurality of first screen sharing applications available in each conference room terminal 3 and the user terminal 2, of one or a plurality of screen sharing applications available in each conference room terminal 3 and a screen sharing application available in the user terminal 2 that has made the screen sharing request. Specifically, the control unit 11 refers to the user terminal information D4 and the conference room terminal information D5 to specify one or a plurality of first screen sharing applications which are common to or compatible with each other and available in one or a plurality of conference room terminals 3 and user terminals 2. Step S18 is an example of a specifying step of the present disclosure.

Next, in Step S19, the control unit 11 specifies connection information (IP address, PIN number, etc.) for connecting to the one or plurality of conference room terminals 3 that can use the first screen sharing application.

Then, in Step S20, the control unit 11 outputs a display instruction including the identification information of the first screen sharing application and the connection information, to the user terminal 2 that has made the screen sharing request. When the user terminal 2 acquires the display instruction as described above (Step S28 in FIG. 10), the user terminal 2 outputs the display instruction to a predetermined conference room terminal 3. Step S20 is an example of an output step of the present disclosure.

As described above, the management server 1, the user terminal 2, and the conference room terminal 3 execute the conference support process so that all users participating in the conference share the screen. The conference support process illustrated in FIG. 10 can be executed on each of the user terminals 2 in parallel. Therefore, it is possible to display the display screen of each of the user terminals 2 on a predetermined conference room terminal 3. For example, when the user A shares the display screen of the user terminal 2A, if the user B presses the screen sharing button on the user terminal 2B, the display screen of the user terminal 2B is shared.

According to the conference system 100 of the present embodiment, the user performs only a screen sharing operation on his/her own user terminal 2, thereby enabling to display the display screen of this user terminal 2 on each conference room terminal 3. Further, even if the screen sharing applications installed on the user terminal 2 and the conference room terminal 3 are different, the user performs only the screen sharing operation, thereby enabling to display the display screen of the user terminal 2 on each conference room terminal 3. Therefore, it is possible to improve the operability when sharing the display screen by a plurality of conference room terminals 3 (display devices).

Figure 12:
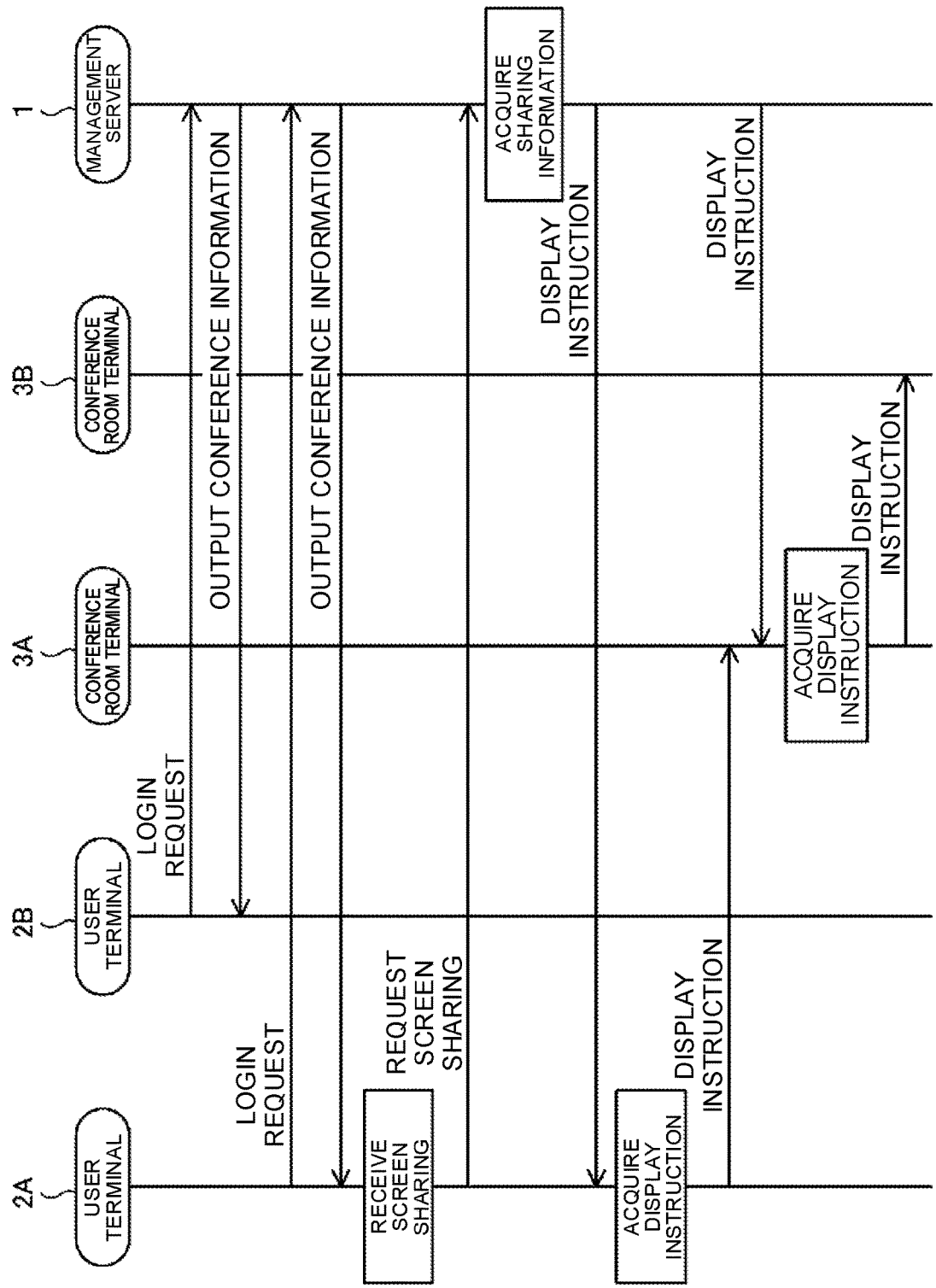
FIG. 12 is a sequence diagram for explaining an example of a procedure of the conference support process executed in the conference system according to another embodiment of the present disclosure.

The present disclosure is not limited to the above-described embodiment. As another embodiment, for example, as illustrated in FIG. 12, when the management server 1 acquires the screen sharing request from the user terminal 2A, the management server 1 may output the display instruction to the user terminal 2A and the conference room terminal 3A arranged in the conference room 1 in which the user terminal 2A is arranged. Then, when the user terminal 2A acquires the display instruction from the management server 1, the user terminal 2A outputs the display instruction to the conference room terminal 3A. When the conference room terminal 3A acquires the display instruction from the management server 1, the conference room terminal 3A outputs the display instruction to the conference room terminal 3B. In this case, the management server 1 outputs the display instruction specifying the first screen sharing application that can be used in the user terminal 2A and the conference room terminal 3A to the user terminal 2A, and outputs the display instruction specifying the first screen sharing application that can be used in the conference room terminal 3A and the conference room terminal 3B to the conference room terminal 3A.

As described above, the management server 1 outputs the display instruction including the identification information of the first screen sharing application and the connection information for connecting the first user terminal 2 and the first conference room terminal 3, to the first user terminal 2, and outputs the display instruction including the identification information of the first screen sharing application and the connection information for connecting the first conference room terminal 3 and the second conference room terminal 3, to the first conference room terminal 3.

As a result, the display screen of the user terminal 2A is directly displayed on the conference room terminal 3A, and is displayed on the conference room terminal 3B via the conference room terminal 3A.

As another embodiment, for example, as illustrated in FIG. 13, when the management server 1 acquires the screen sharing request from the user terminal 2A, the management server 1 may output the display instruction to the user terminal 2A and the user terminal 2C (see FIG. 1) arranged in the conference room 2 different from the conference room 1 in which the user terminal 2A is arranged. For example, the management server 1 outputs, to the user terminal 2A, the display instruction specifying the first screen sharing application (for example, "A001") that can be used in the user terminal 2A and the conference room terminal 3A and also the first screen sharing application (for example, "A002") that can be used in the user terminal 2A and the user terminal 2C. When the user terminal 2A acquires the display instruction from the management server 1, the user terminal 2A outputs the display instruction to the conference room terminal 3A and the user terminal 2C.

Further, the management server 1 outputs the display instruction specifying the first screen sharing application (for example, "HDMI") that can be used in the user terminal 2C and the conference room terminal 3B, to the user terminal 2C. When the management server 1 outputs a display instruction using the HDMI cable, it may output a message prompting the user C to connect, for example, the HDMI cable, an operation screen, or the like. When the user terminal 2C acquires the display instruction, the user terminal 2C controls, for example, the display unit 24 to display a screen prompting connection between the user terminal 2C and the conference room terminal 3B with an HDMI cable. When the user C connects the user terminal 2C and the conference room terminal 3B with the HDMI cable, the user terminal 2C and the conference room terminal 3B perform a connection process. When the connection between the user terminal 2C and the conference room terminal 3B is established, the user terminal 2C outputs a display instruction to the conference room terminal 3B based on the display instruction acquired from the user terminal 2A.

As described above, the management server 1 may output, to the first user terminal 2, the display instruction including the identification information of the first screen sharing application and the connection information for connecting the first user terminal 2 and the first conference room terminal 3. The management server 1 may also output, to the second user terminal 2, the display instruction including the identification information of the first screen sharing application and the connection information for connecting the second user terminal 2 with the second conference room terminal 3.

As a result, the display screen of the user terminal 2A is directly displayed on the conference room terminal 3A and is displayed on the conference room terminal 3B via the user terminal 2C.

As another embodiment, the management server 1 may specify the user's location (conference room) by communication such as ultrasonic waves or Bluetooth (registered trademark) without referring to the conference information D1.

Here, when there is no user in the conference room, and if the shared screen is displayed on the conference room terminal 3 of the conference room, there is a possibility of information leakage. Therefore, the management server 1 may determine whether or not there is a user in the conference room, and if there is no user, the management server 1 may hide the display of the conference room terminal 3 in the conference room or perform a restriction process (mosaic process, etc.).

It is to be understood that the embodiments herein are illustrative and not restrictive, since the scope of the disclosure is defined by the appended claims rather than by the description preceding them, and all changes that fall within metes and bounds of the claims, or equivalence of such metes and bounds thereof are therefore intended to be embraced by the claims.

The invention claimed is:

1. An information processing system comprising:
one or a plurality of user terminals each including a processor, a display screen, a storage, and a first communication interface;
one or a plurality of display devices; and
a management server including a plurality of processors, a storage, and a second communication interface, the management server communicating with the one or the plurality of user terminals via the first and second communication interfaces, wherein:
the plurality of processors includes:
a reception processor which receives a display request for displaying the display screen of a first user terminal among the one or the plurality of user terminals, on the one or the plurality of display devices, from the first user terminal of a first user among a plurality of users participating in a conference;
a specifying processor which specifies a first display application for enabling the display screen to be shared by the plurality of users participating in the conference, among a plurality of display applications which can be used in each of the first user terminal and the one or the plurality of display devices, when the display request has been received by the reception processor; and
an output processor which outputs:
a first display instruction including information of the first display application specified by the specifying processor, to the first user terminal, the first display instruction including identification information of the first display application and connection information for connecting the first user terminal and a first display device, and outputs, to the first display device, the first display instruction including the identification information of the first display application and connection information for connecting the first display device and a second display device,
upon acquiring the first display instruction, the first user terminal outputs, to the one or the plurality of display devices, a second display instruction for displaying the display screen displayed on the first user terminal in accordance with the first display application, and outputs, to a second user terminal located at a second location, the first display instruction including the identification information of the first display application, and
a number of simultaneous connections that indicates a number of devices that can be simultaneously connected, is registered in association with each of the plurality of display applications, and the display screen is shared by devices in a range of the number of simultaneous connections associated with the first display application.

2. The information processing system according to claim 1, wherein
the specifying processor further specifies a participation location of each of the plurality of users who participate in the conference, and specifies a display device installed at the specified participation location.

3. The information processing system according to claim 2, wherein
the specifying processor specifies the first display application which can be used in the display device, in association with each of the specified display devices.

4. The information processing system according to claim 3, wherein
the specifying processor specifies the first display application that can be used in the first user terminal.

5. The information processing system according to claim 4, wherein
the specifying processor specifies the first display application for enabling the display screen of the first user terminal to be displayed on the plurality of display devices, of the display application which can be used in the display device and the display application which can be used in the first user terminal.

6. The information processing system according to claim 1, wherein
the reception processor receives the display request when a predetermined operation has been performed by the first user on an operation screen displayed on the first user terminal.

7. An information processing method to be executed by one or a plurality of processors implemented in a management server, the management server communicating with one or a plurality of user terminals and one or a plurality of display devices via communication interfaces, the information processing method comprising:
receiving a display request for displaying a display screen of a first user terminal among the one or the plurality of user terminals, on the one or the plurality of display devices, from the first user terminal of a first user among a plurality of users participating in a conference;
specifying a first display application for enabling the display screen to be shared by the plurality of users participating in the conference, among a plurality of display applications which can be used in each of the first user terminal and the one or the plurality of display devices, when the display request has been received in the receiving; and
outputting a first display instruction including information of the first display application specified in the specifying, to the first user terminal, the first display instruction including identification information of the first display application and connection information for connecting the first user terminal and a first display device, and outputs, to the first display device, the first display instruction including the identification information of the first display application and connection information for connecting the first display device and a second display device,
wherein upon acquiring the first display instruction, the first user terminal outputs, to the one or the plurality of display devices, a second display instruction for displaying the display screen displayed on the first user terminal in accordance with the first display application, and outputs, to a second user terminal located at a second location, the first display instruction including the identification information of the first display application, and
a number of simultaneous connections that indicates a number of devices that can be simultaneously connected, is registered in association with each of the plurality of display applications, and the display screen is shared by devices in a range of the number of simultaneous connections associated with the first display application.

8. A non-transitory computer readable recording medium which records an information processing program for controlling one or a plurality of processors implemented in a management server, the management server communicating with one or a plurality of user
terminals and one or a plurality of display devices via communication interfaces, the information processing program is configured to execute:
receiving a display request for displaying a display screen of a first user terminal among the one or the plurality of user terminals, on the one or a-the plurality of display devices, from the first user terminal of a first user among a plurality of users participating in a conference;
specifying a first display application for enabling the display screen to be shared by the plurality of users participating in the conference, among a plurality of display applications which can be used in each of the first user terminal and the one or the plurality of display devices, when the display request has been received in the receiving; and
outputting a first display instruction including information of the first display application specified in the specifying, to the first user terminal, the first display instruction including identification information of the first display application and connection information for connecting the first user terminal and a first display device, and outputs, to the first display device, the first display instruction including the identification information of the first display application and connection information for connecting the first display device and a second display device,
wherein upon acquiring the first display instruction, the first user terminal outputs, to the one or the plurality of display devices, a second display instruction for displaying the display screen displayed on the first user terminal in accordance with the first display application, and outputting, to a second user terminal located at a second location, the first display instruction including the identification information of the first display application, and
a number of simultaneous connections that indicates a number of devices that can be simultaneously connected, is registered in association with each of the plurality of display applications, and the display screen is shared by devices in a range of the number of simultaneous connections associated with the first display application.

* * * * *